Patented Nov. 2, 1926.

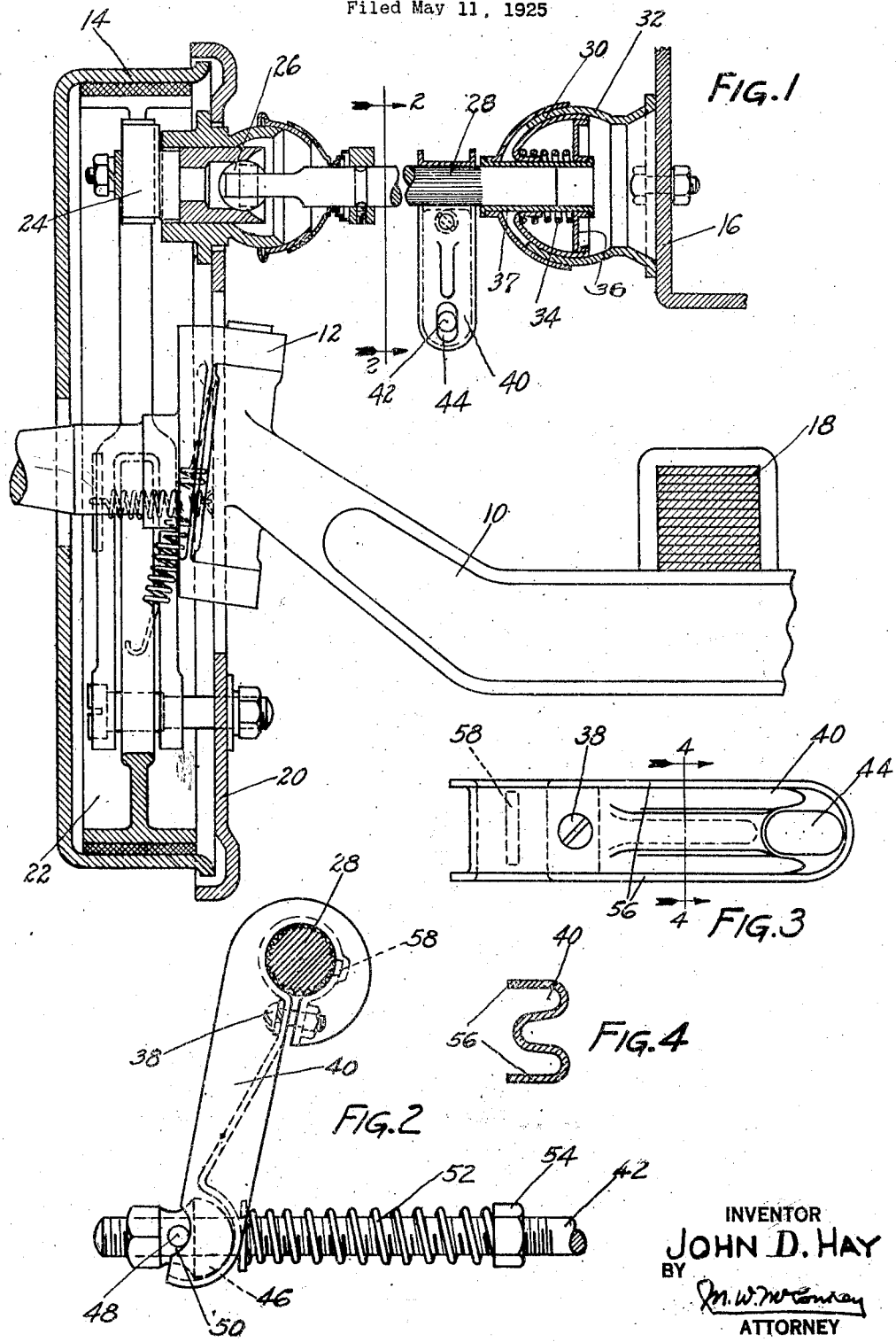

1,605,402

UNITED STATES PATENT OFFICE.

JOHN D. HAY, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MEANS.

Application filed May 11, 1925. Serial No. 29,366.

This invention relates to brakes, and is illustrated as embodied in an automobile chassis having novel brake-operating means for a front brake. An object is to secure an economical and easily adjusted arrangement by the use of a novel pressed metal operating arm hereinafter described.

This and other objects and features of the invention, including various novel combinations of parts and desirable particular constructions will be apparent from the following description of one illustrative embodiment shown in the accompanying drawings, in which:

Figure 1 is a vertical transverse section through one front brake and associated parts;

Figure 2 is a vertical section on the line 2—2 of Figure 1, showing the operating arm in side elevation;

Figure 3 is a plane view of the arm, detached, looking toward the side which faces left in Figure 2; and Figure 4 is a section through the arm on the line 4—4 of Figure 3.

In the arrangement of parts in Figure 1, 10 indicates an axle, to which is swivelled by the usual king pin a knuckle 12 rotatably supporting a wheel having a brake drum 14. The axle 10, together with a rear axle (not shown) support a chassis frame 16 by means of the usual springs 18. The brake or other retarding means is shown supported on a backing plate 20 carried by knuckle 12, and may include shoes 22 spread against the drum by a double cam 24.

Cam 24, or its equivalent. is operated through a universal joint 26 in the swivelling axis, by a shaft 28 slidingly carried at its inner end by a universal support 30 on the chassis frame. The particular support shown includes inner and outer pressed metal semi-spherical parts yieldingly held in sliding engagement with the inside and outside of a stationary semi-spherical bracket 32 bolted to the chassis frame 16, the parts being held by a spring 34 confined by a diaphragm 36 on a sleeve 37 which slidingly receives the end of shaft 28.

On a serrated part of shaft 28 is clamped by a clamp screw 38 a pressed metal arm 40 having a semi-spherical socket pressed in its lower end. A link 42 forming part of the brake-applying mechanism projects through an opening 44 in the socket, and is threaded to receive a semi-spherical stop 46 having a polygonal end to receive a wrench, and having a cross pin 48 seated in notches 50 in the edges of the socket. Arm 40 is held against stop 46 by a spring 52 surrounding the link, and confined by a second stop 54 on the opposite side of the arm. Spring 52 permits ready adjustment of stop 46, and pin 48 preserves such adjustment.

Arm 40 is pressed to form strengthening edge flanges 56, which are carried entirely around the shaft 28. If desired, serrations may be pressed in the upper end of the arm to engage the serrations on shaft 28, or a keyway 58 may be formed for a key securing the arm to the shaft.

While one illustrative embodiment of the invention has been described in detail, it is not my intention to limit its scope to that particular embodiment, or otherwise than by the terms of the appended claims.

I claim:

1. A pressed metal operating arm turned to form a cylindrical shaft-embracing sleeve at one end and having stiffening flanges at its edges extending entirely around said sleeve.

2. A pressed metal operating arm turned to form a cylindrical shaft-embracing sleeve at one end and having stiffening flanges at its edges extending entirely around said sleeve, together with means for clamping together the two parts at the ends of the sleeve to contract the sleeve.

3. A pressed metal operating arm generally channel-shaped in section, with spaced stiffening flanges at its sides, and with the bottom of the channel at one end of the arm pressed into a semispherical socket and with the side of said socket away from the end of the arm forming the termination of a rib pressed from said bottom between said spaced side flanges and additionally stiffening the arm.

4. A pressed metal operating arm generally channel-shaped in section, with spaced stiffening flanges at its sides, and with the bottom of the channel at one end of the arm pressed into a semispherical socket and with the side of said socket away from the end of the arm forming the termination of a rib pressed from said bottom between said spaced side flanges and additionally stiffening the arm, the side flanges being notched on opposite sides of the socet substantially in the socket diameter which extends crosswise of the arm.

5. A pressed metal operating arm generally channel-shaped in section, with spaced stiffening flanges at its sides, and with the bottom of the channel at one end of the arm pressed into a semispherical socket and with the side of said socket away from the end of the arm forming the termination of a rib pressed from said bottom between said spaced side flanges and additionally stiffening the arm, the rib being deepest adjacent the socket and tapering to become progressively shallower toward the opposite end of the arm.

In testimony whereof I have hereunto signed my name.

JOHN D. HAY.